United States Patent
Rinaldi et al.

(10) Patent No.: US 10,802,930 B2
(45) Date of Patent: Oct. 13, 2020

(54) DETERMINING A RECOVERY MECHANISM IN A STORAGE SYSTEM USING A MACHINE LEARNING MODULE

(71) Applicant: INTERNATIONAL BUSINESS MACHINES CORPORATION, Armonk, NY (US)

(72) Inventors: Brian A. Rinaldi, Tucson, AZ (US); Clint A. Hardy, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/184,681

(22) Filed: Nov. 8, 2018

(65) Prior Publication Data
US 2020/0151065 A1    May 14, 2020

(51) Int. Cl.
| | | |
|---|---|---|
| *G06F 11/00* | (2006.01) | |
| *G06F 11/14* | (2006.01) | |
| *G06F 3/06* | (2006.01) | |
| *G06N 20/00* | (2019.01) | |

(52) U.S. Cl.
CPC ........ *G06F 11/1469* (2013.01); *G06F 3/0617* (2013.01); *G06F 3/0632* (2013.01); *G06F 3/0689* (2013.01); *G06N 20/00* (2019.01)

(58) Field of Classification Search
CPC combination set(s) only.
See application file for complete search history.

(56) References Cited

U.S. PATENT DOCUMENTS

| | | |
|---|---|---|
| 8,417,432 B2 | 4/2013 | Butler |
| 9,015,093 B1 | 4/2015 | Commons |
| 9,798,612 B1 | 10/2017 | Foerster et al. |
| 2009/0106583 A1 | 4/2009 | Kawamura |
| 2018/0121286 A1 | 5/2018 | Sipos et al. |
| 2018/0322383 A1 | 11/2018 | Feng et al. |
| 2020/0057561 A1 | 2/2020 | Lai et al. |

OTHER PUBLICATIONS

Anonymous, "Machine Learning to Select Best Network Access Point", IP.com No. IPCOM000252087D, Dec. 15, 2017, 35 pp.
Anonymous, "Mretrospective User Input Inference and Correction", IP.com No. IPCOM000252365D, Jan. 5, 2018, 38 pp.
Blundell, C., et al., "Weight Uncertainty in Neural Networks", Proceedings of the 32nd International Conference on Machine Learning, May 2015, 10 pp.
Dufrasne, B., et al., IBM DS8880 Architecture and Implementation (Release 8.3), IBM Redbooks, Nov. 2017, 510 pp.

(Continued)

*Primary Examiner* — Yong J Choe
(74) *Attorney, Agent, or Firm* — Konrad Raynes Davda & Victor LLP; Rabindranath Dutta

(57) ABSTRACT

In response to an occurrence of a failure in a storage controller, an input on a plurality of attributes of the storage controller at a time of occurrence of the failure is provided to a machine learning module. In response to receiving the input, the machine learning module generates a plurality of output values corresponding to a plurality of recovery mechanisms to recover from the failure in the storage controller. A recovery is made from the failure in the storage controller, by applying a recovery mechanism whose output value is greatest among the plurality of output values that are generated by the machine learning module.

20 Claims, 18 Drawing Sheets

(56) References Cited

OTHER PUBLICATIONS

Li, G., et al., "Understanding Error Propagation in Deep Learning Neural Network (DNN) Accelerators and Applications", Proceedings of SC17, Nov. 2017, 12 pp.
Zhang, S., et al., "Regularizing Neural Networks via Retaining Confident Connections", Entropy 2017, 19, Jun. 30, 2017, 14 pp.
List of IBM Patents or Patent Applications Treated as Related, dated Nov. 8, 2018, pp. 2.
U.S. Appl. No. 16/184,691, filed Nov. 8, 2018, entitled "Determine Recovery Mechanism in a Storage System by Training a Machine Learning Module", by B.A. Rinaldi et al., 52 pp. [18.824 (Appln)].
Office Action 1 for U.S. Appl. No. 16/184,691, dated May 4, 2020, 16 pp. [18.824 (OA1)].
Response to Office Action 1 for U.S. Appl. No. 16/184,691, dated Aug. 4, 2020, 4 pp. [18.824 (ROA1)].

FIG. 10

1000 — Example for adjustment of weights via back propagation by computing margin of error during training of the machine learning module

| | Output value for recovery mechanism computed by machine learning module — 1002 |
|---|---|
| Recovery mechanism A | 0.1 |
| Recovery mechanism B | 0.9 |
| Recovery mechanism C | 0.4 |

↓

1004 — Administrator indicates that correct recovery mechanism should be "Recovery Mechanism C"

↓

1006

| | Output value for recovery mechanism computed by machine learning module | What the correct output value should be (from administrator provided information) | Margin of error of the output for the recovery mechanism |
|---|---|---|---|
| Recovery mechanism A | 0.1 | 0.0 | 0.1 |
| Recovery mechanism B | 0.9 | 0.0 | 0.9 |
| Recovery mechanism C | 0.4 | 1.0 | -0.6 |

1010  1008  1012  1014  1016

1018

1020 — Use the margin of error to adjust weights in the machine learning module via back propagation

DETERMINING A RECOVERY MECHANISM IN A STORAGE SYSTEM USING A MACHINE LEARNING MODULE

BACKGROUND

1. Field

Embodiments relate to usage of a machine learning module to determine a recovery mechanism in a storage system.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts. A plurality of such storage controllers, hosts, and other computational devices may be deployed at one or more sites to provide an environment for storage and management of data and also to provide an environment for data processing.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. Further details of a storage controller and its various components may be found in the publication "IBM DS8880 Architecture and Implementation (Release 8.3)," published November 2017, by International Business Machines Corporation.

Artificial neural networks (also referred to as neural networks) are computing systems that may have been inspired by the biological neural networks that constitute animal brains. Neural networks may be configured to use a feedback mechanism to learn to perform certain computational tasks. Neural networks are a type of machine learning mechanism.

SUMMARY OF THE PREFERRED EMBODIMENTS

Provided are a method, system, and computer program product in which in response to an occurrence of a failure in a storage controller, an input on a plurality of attributes of the storage controller at a time of occurrence of the failure is provided to a machine learning module. In response to receiving the input, the machine learning module generates a plurality of output values corresponding to a plurality of recovery mechanisms to recover from the failure in the storage controller. A recovery is made from the failure in the storage controller, by applying a recovery mechanism whose output value is greatest among the plurality of output values that are generated by the machine learning module.

In certain embodiments, the storage controller controls access to a plurality of storage devices for a plurality of hosts, and the storage controller is comprised of: a host adapter that is an interface between the storage controller and a host computational device; a device adapter that is an interface between the storage controller and a storage device that is in a Redundant Array of Independent Disks (RAID) configuration; a cache; and a non-volatile storage (NVS).

In further embodiments, the plurality of attributes includes: measures corresponding to indications and characteristics of errors and panics that have been generated in the storage controller; and a measure of a hardware part associated with the failure.

In yet further embodiments the plurality of attributes includes: a measure of whether the cache is queued for segments; a measure of whether the NVS is queued for segments; a measure of whether the device adapter is queued for resources; and a measure of whether a RAID rebuild is in progress.

In certain embodiments, the plurality of attributes includes: a measure of whether the storage controller is executing a mainline code or an error recovery code at a time of the failure; a measure of whether the device adapter is fenced; and a measure of whether the host adapter is fenced.

In additional embodiments, the plurality of attributes includes: a measure of whether the storage controller is in a single server configuration or is in a dual server configuration; and a measure of previously known recovery mechanisms for errors corresponding to the failure.

In yet additional embodiments, the storage controller transmits the plurality of output values to a central computing device that generates weights and biases that are applied to machine learning modules of a plurality of storage controllers.

BRIEF DESCRIPTION OF THE DRAWINGS

Referring now to the drawings in which like reference numbers represent corresponding parts throughout:

FIG. 10 illustrates a block diagram that shows how adjustment of weights via back propagation is performed by computing a margin of error during a training of the learning module, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Failures may occur in a storage controller that controls access to one or more storage devices and allows one or more host computational devices to access data stored in the one or more storage devices. The term failure as used in this disclosure is used to encompass any type of errors, faults, hardware failures, software failures, firmware failures, or other types of system malfunction that may occur. There are many mechanisms for the storage controller to recover from the failures. Generally the recovery mechanism for each type of failure is based on the experience of administrators of the storage controller. However, administrators may differ in their level of experience and may not be able to choose the best recovery mechanism. Additionally, different storage controllers may be configured differently and may have different components and processes. The best recovery mechanism for a storage controller may depend on the configuration of the storage controller and the components and processes of the storage controller. With the large number of configurations, components, and processes of a storage controller, it is not always possible for an administrator to expeditiously determine the best recovery mechanism.

In certain embodiments, a machine learning module is used to determine the best recovery mechanism for a storage controller, in response to a failure that occurs in the storage controller. In certain embodiments, the machine learning module is a neural network. The neural network may be used for error analysis where numerous inputs are available and various recovery mechanisms are available, to determine the best recovery mechanism. The neural network may be continually trained via adjustment of weights and biases within the neural network to improve the predictive accuracy of determining the best recovery mechanism. In certain other embodiments, the storage controller transmits a plurality of output values to a central computing device that generates weights and biases to be applied to machine learning modules of a plurality of storage controllers. In certain additional embodiments, a plurality of storage controllers share weights and biases among themselves. As a result of determining the best recovery mechanism by one or more neural networks, improvements are made to the operations of one or more storage controllers.

Exemplary Embodiments

Figure 1:
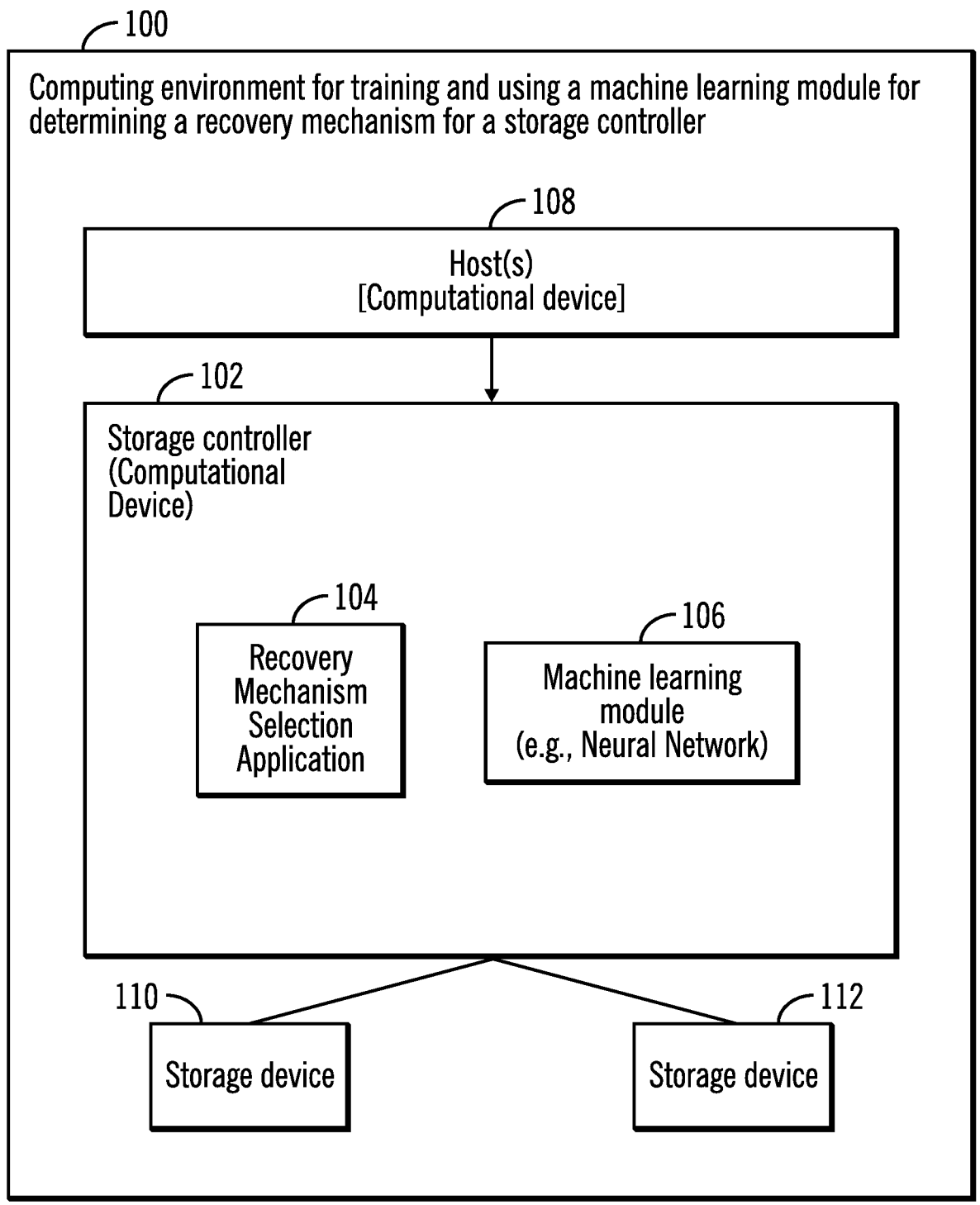
FIG. 1 illustrates a block diagram of a computing environment for training and using a machine learning module for determining a recovery mechanism for a storage controller, in accordance with certain embodiments.

FIG. 1 illustrates a block diagram of a computing environment 100 for training and using a machine learning module for determining a recovery mechanism for a storage controller, in accordance with certain embodiments. The computing environment 100 comprises a storage controller 102 in which a recovery mechanism selection application 104 and a machine learning module 106 are implemented, in accordance with certain embodiments.

The storage controller 102 is configured to receive input/output (I/O) requests from the host computational devices 108 and provide access to a plurality of storage devices 110, 112 that are present in the computing environment 100. The storage controller 102 allows the one or more hosts computing devices 108 to perform input/output (I/O) operations with logical storage maintained by the storage controller 102. The physical storage corresponding to the logical storage may be found in one or more of the storage devices 110, 112 and/or a cache of the storage controllers 102.

The storage controller 102 and the host computational devices 108 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The storage controller 102, the host computational devices 108, and the storage devices 110, 112 may be elements in any suitable network, such as, a storage area network, a wide area network, the Internet, an intranet, etc. In certain embodiments, the storage controller 102, the host computational devices 108, and the storage devices 110, 112 may be elements in a cloud computing environment.

The plurality of storage devices 110, 112 may be comprised of any storage devices known in the art, such as solid state drives (SSD), hard disk drives (HDD), etc., that may be configured as a Redundant Array of Independent Disks (RAID).

In certain embodiments, the recovery mechanism selection application 104 and the machine learning module 106 may be implemented in software, hardware, firmware or any combination thereof. The recovery mechanism selection application 104 uses the machine learning module 106 to determine the recovery mechanism to use for recovering from a failure in the storage controller 102.

In certain embodiments, the machine learning module 106 may implement a machine learning technique such as decision tree learning, association rule learning, neural network, inductive programming logic, support vector machines, Bayesian models, etc. In certain embodiments, the machine learning module 106 is a neural network implemented in the storage controller 102 or in some other computational device that receives failure data and other information related to the storage controller 102.

Therefore, FIG. 1 illustrates certain embodiments in which a machine learning module 106 is used by a recovery mechanism selection application 104 to determine the best recovery mechanism for recovering from a failure in the storage controller 102.

Figure 2:
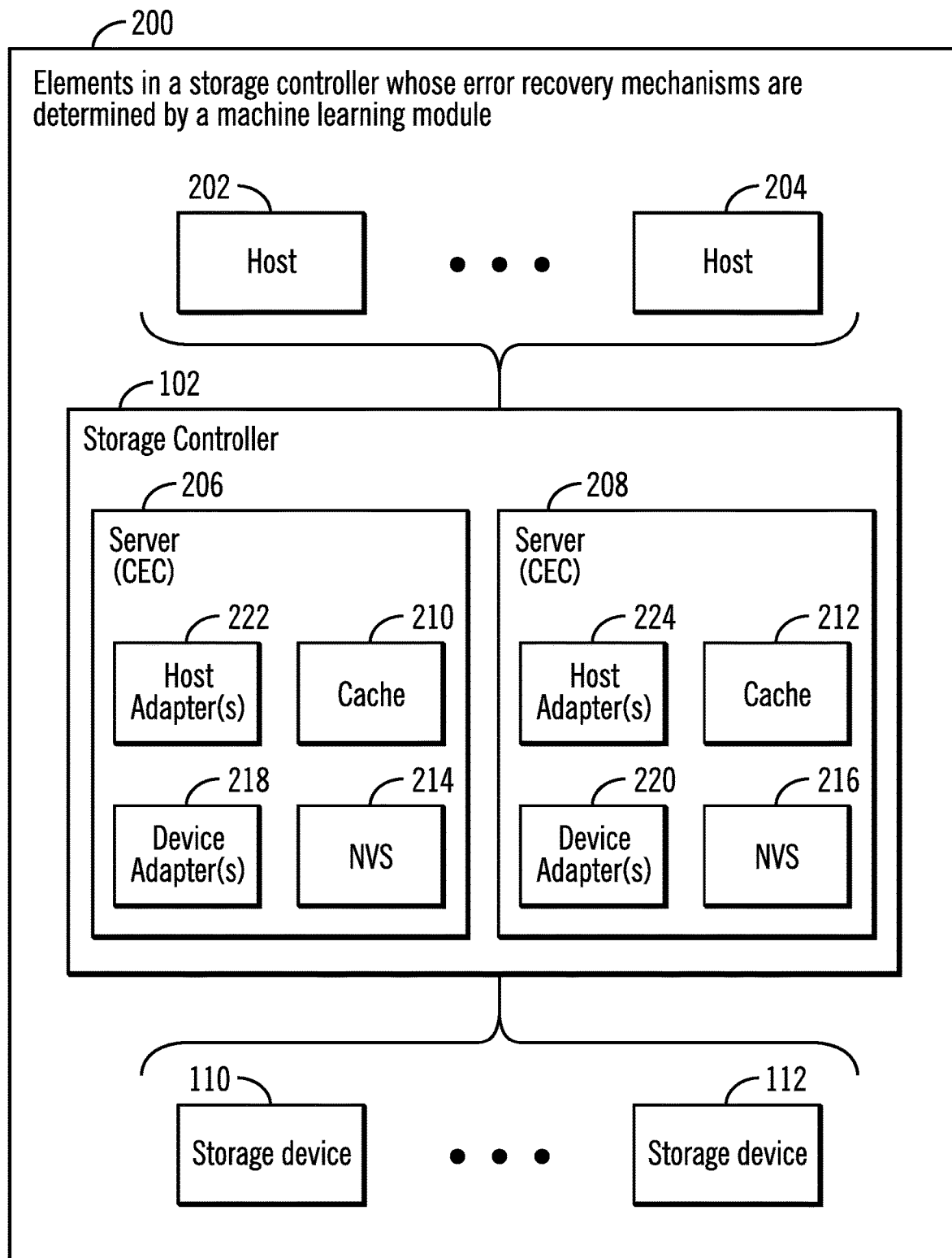
FIG. 2 illustrates a block diagram that shows elements in a storage controller whose error recovery mechanisms are determined by a machine learning module, in accordance with certain embodiments.

FIG. 2 illustrates a block diagram 200 that shows additional elements in the storage controller 102 whose error recovery mechanisms are determined by the machine learning module 106, in accordance with certain embodiments.

The storage controller 102 is coupled to a plurality of hosts 202, 204 (corresponds to the hosts 108 shown in FIG. 1) and a plurality of storage devices 110, 112. The storage controller 102 has two servers 206, 208, which are referred to as central processor complexes (CPC). The CPC is also known as the processor complex or the internal server. Both servers 206, 208 share the system workload of the storage controller 102. The servers 206, 208 are redundant, and either server can fail over to the other server if a failure occurs, or for scheduled maintenance or upgrade tasks.

Each server may include a cache which is a volatile memory that is used as a read and write cache. For example, cache 210 is included in server 206 and cache 212 is included in server 208. Each server may also include a non-volatile storage (NVS) that is used to maintain and backup a second copy of the cache. For example, NVS 214 is included in server 206 and NVS 216 is included in server 208. If power is lost, batteries keep the storage controller 102 running until all data in NVS is written to internal storage of the storage controller 102. For processing host data, the storage controller 102 tries to maintain two copies of the data while the data moves through the storage controller 102. The cache and NVS of each server are used for holding host data.

When a write is sent to a storage volume and both the servers 206, 208 are operational, the write data is placed into the cache of the owning server for the write (e.g., server 206) and into the NVS of the other server (e.g., server 208). The NVS copy of the write data is accessed from the other server only if a write failure occurs and the cache of the owning server is empty or possibly invalid. Otherwise, the NVS copy of the write data in the other server is discarded after the destage from cache of the owning server to the storage devices 110,112 is complete. In certain embodiments, the cache 210 of server 206 is used for all logical volumes that are members of even logical subsystems (LSS), and the cache 212 of server 208 is used for all logical volumes that are members of odd logical subsystems, where the logical subsystems are numbered consecutively.

In certain embodiments, a plurality of device adapters 218, 220 may provide an interface between the storage controller 102 and the plurality of storage devices 110, 112. A plurality of host adapters 222, 224 may provide an interface between the storage controller 102 and the plurality of hosts 202, 204. In FIG. 2, the device adapter 218 and the host adapter 222 are included in server 206, and the device adapter 220 and host adapter 224 are included in server 208.

Figure 3:
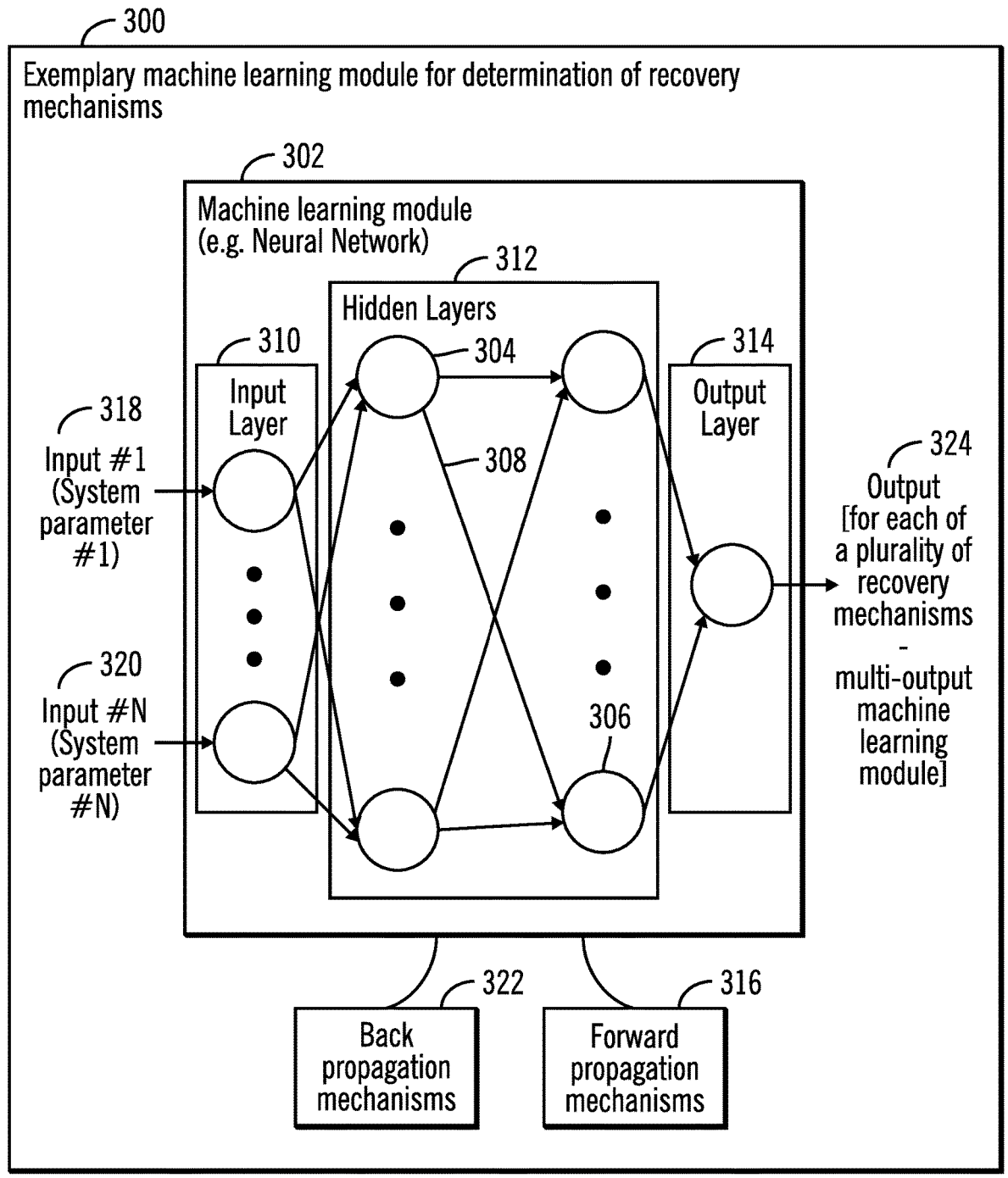
FIG. 3 illustrates a block diagram that shows a machine learning module for determination of recovery mechanisms, in accordance with certain embodiments.

FIG. 3 illustrates a block diagram 300 that shows a machine learning module 302 (corresponds to machine learning module 106 shown in FIG. 1) for determination of recovery mechanisms in accordance with certain embodiments. The block diagram 300 shows that the machine learning module 106 comprises a neural network 302.

The neural network 302 may comprise a collection of nodes with links connecting them, where the links are referred to as connections. For example, FIG. 3 shows a node 304 connected by a connection 308 to the node 306. The collection of nodes may be organized into three main parts: an input layer 310, one or more hidden layers, 312 and an output layer 314.

The connection between one node and another is represented by a number called a weight, where the weight may be either positive (if one node excites another) or negative (if one node suppresses or inhibits another). Training the neural network 302 entails calibrating the weights in the neural network 302 via mechanisms referred to as forward propagation 316 and back propagation 322. Bias nodes that are not connected to any previous layer may also be maintained in the neural network 302. A bias is an extra input of 1 with a weight attached to it for a node.

In forward propagation 316, a set of weights are applied to the input data 318, 320 to calculate an output 324. For the first forward propagation, the set of weights are selected randomly. In back propagation 322 a measurement is made the margin of error of the output 324 and the weights are adjusted to decrease the error. Back propagation 322 compares the output that the neural network 302 produces with the output that the neural network 302 was meant to produce, and uses the difference between them to modify the weights of the connections between the nodes of the neural network 302, starting from the output layer 314 through the hidden layers 312 to the input layer 310, i.e., going backward in the neural network 302. In time, back propagation 322 causes the neural network 302 to learn, reducing the difference between actual and intended output to the point where the two exactly coincide. Thus, the neural network 302 is configured to repeat both forward and back propagation until the weights (and potentially the biases) of the neural network 302 are calibrated to accurately predict an output.

In certain embodiments, the machine learning module 106 may be implemented in software, firmware, hardware or any combination thereof. For example, in one embodiment the machine learning module 106 may be implemented only in software, whereas in another embodiment the machine learning module 106 may be implemented in a combination of software, firmware, and hardware. In one embodiment, each node of the machine learning module 106 may be a lightweight hardware processor (e.g., a 1-bit processor) and there may be hardwired connections among the lightweight hardware processors. Software and/or firmware may implement the adjustment of weights of the links via adjustments in signals propagated via the hardwired connections.

In certain embodiments, the plurality of inputs 318, 320 comprise a plurality of system parameters of the computing environment 100. The output 324 may provide an indication as to the recovery mechanism to use for recovery from a failure occurring in the storage controller 102. The output 324 may be provided for each of a plurality of recovery mechanisms and the value of the output corresponding to each recovery mechanism may range from 0 to 1. The output 324 may be generated in a multi-output machine learning module 302 via many different mechanisms.

In certain embodiments, the machine learning module 302 is trained to improve the selection of the best recovery mechanism in the storage controller 102. The training continuously improves the predictive ability of the machine learning module 302 over time.

Figure 4:
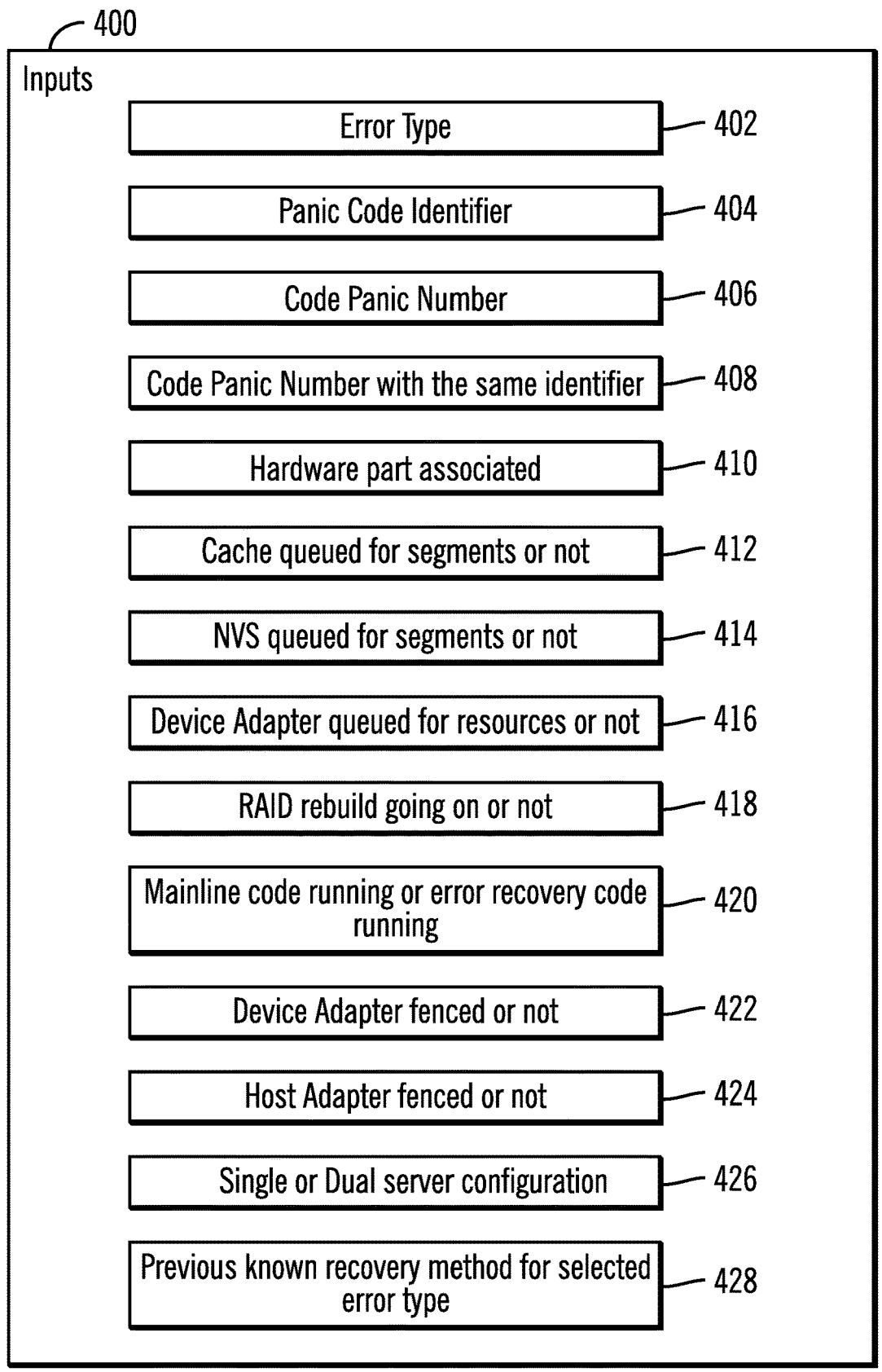
FIG. 4 illustrates a block diagram that shows exemplary inputs to the machine learning module, in accordance with certain embodiments.

FIG. 4 illustrates a block diagram that shows exemplary inputs 400 to the machine learning module 106, in accordance with certain embodiments. The exemplary inputs 400 are inputs that may affect the determination of the best recovery mechanism to use to recover from a failure in the storage controller 102.

In certain embodiments the exemplary inputs may be indicative of the following:

(1) Error type: This input indicates the type of error, where the type of error may include link errors, code panics, resets, hardware errors, expander errors that show dropped links, etc. [shown via reference numeral 402];
(2) Panic code identifier: This is an input that indicates a panic code identifier [shown via reference numeral 404];
(3) Code panic number: This input indicates a code panic number [shown via reference numeral 406];
(4) Code panic number with the same identifier: If a code panic occurs, then this input indicates a code panic number with the same panic code identifier in a predetermined time interval (e.g., previous 24 hours) [shown via reference numeral 408];
(5) Hardware part associated: Indicates hardware part with error if any [shown via reference numeral 410];
(6) Cache queued for segments or not: This input is set to 1 if the cache is queued for segments, otherwise this input is set to 0 [shown via reference numeral 412];
(7) NVS queued for segments or not: This input is set to 1 if the NVS is queued for segments, otherwise this input is set to 0 [shown via reference numeral 414];
(8) Device Adapter queued for resources: This input is set to 1 if the device adapter is queued for resources, otherwise this input is set to 0 [shown via reference numeral 416];
(9) RAID rebuild going on or not: This input is set to 1 if any Redundant Array of Independent Disk (RAID) in the storage devices is rebuilding, otherwise this input is set to 0 [shown via reference numeral 418];
(10) Mainline code running or error recovery code running: This input is set to 0 if mainline code (i.e., not an error recovery code but the normally running code) is running, otherwise this input is set to the type of error recovery code running at the time of an error [shown via reference numeral 420];
(11) Device adapter fenced or not: This input is set to 1 if any device adapter is fenced (i.e., isolated from other elements and not allowed to operate), else this input is set to 0 [shown via reference numeral 422];
(12) Host adapter fenced or not: This input is set to 1, if any host adapter is fenced, else this input is set to 0 [shown via reference numeral 424];
(13) Single server or dual server configuration: This input is set to 1 if the storage controller 102 is running in a single server mode, else this input is set to 0 [shown via reference numeral 426];
(14) Previous known recovery method for this error type: This indicates a known recovery method number from past experience [shown via reference numeral 428].

It should be noted that many other inputs that affect the selection of the best recovery mechanism may be included beyond those shown in FIG. 4. Many additional types of inputs may be applied to the machine learning module comprising a neural network 106.

Figure 5:
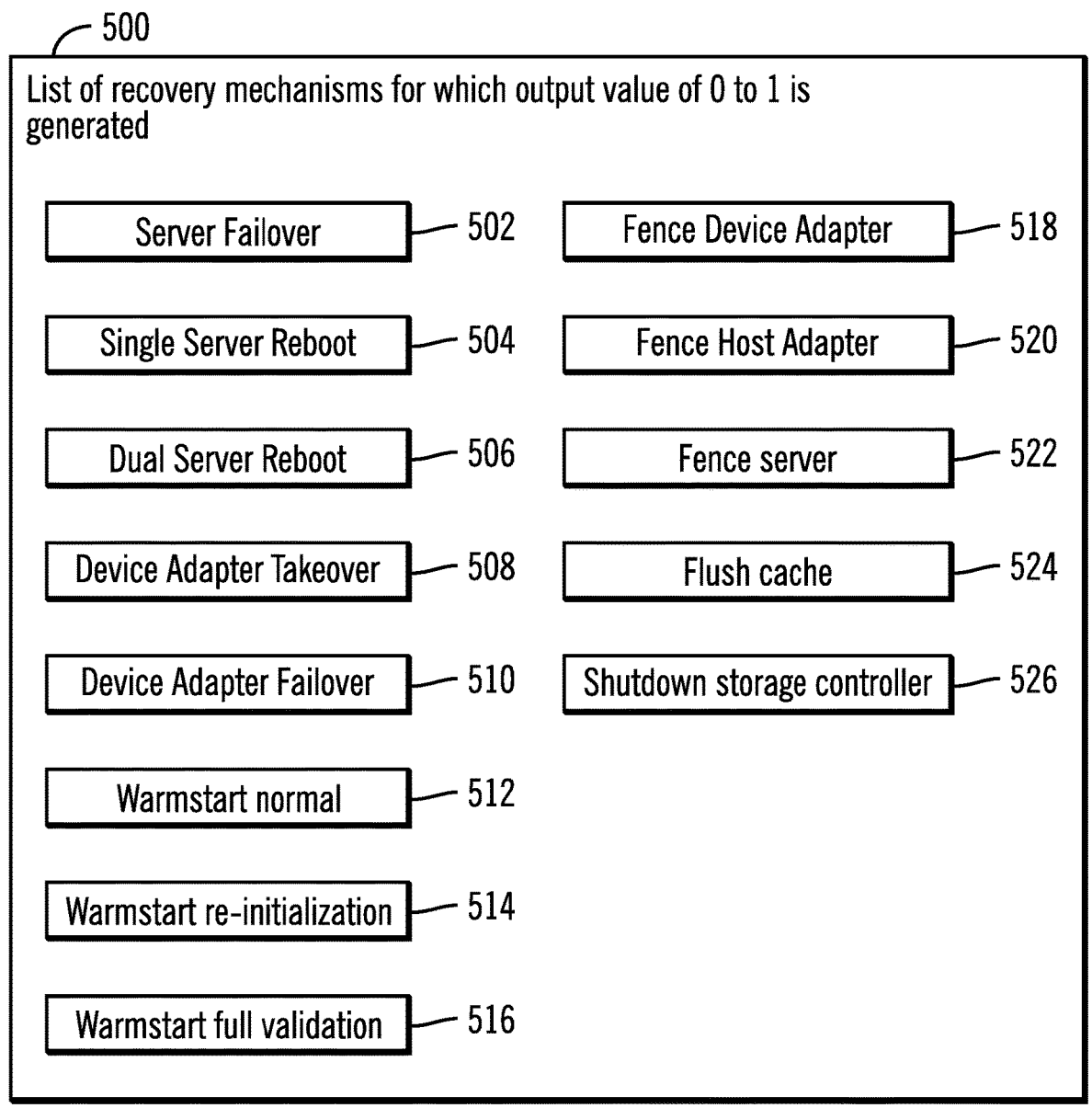
FIG. 5 illustrates a block diagram that shows a list of recovery mechanisms for which output values ranging from 0 to 1 are generated by the machine learning module, in accordance with certain embodiments.

FIG. 5 illustrates a block diagram 500 that shows a list of recovery mechanisms for which output values ranging from 0 to 1 are generated by the machine learning module 106, in accordance with certain embodiments.

The output values may comprise a real number that ranges from 0 to 1 for the following known recovery mechanisms (if all the output values are 0 then no recovery mechanism is performed, otherwise the recovery mechanism with the highest output value is performed):

(1) Server Failover 502: Fail the server with error.
(2) Single Server Reboot 504: Reboot the server with error.
(3) Dual Server Reboot 506: Reboot both servers.
(4) Device Adapter Takeover 508: Takeover device adapter with error.
(5) Device Adapter Failover 510: Fail the device adapter with error.
(6) Warmstart normal 512: Normal cache recovery of active tracks (warmstart is a booting mechanism that does not turn power off and back on, and does not clear memory).
(7) Warmstart re-initialization 514: Discard the data in the cache and recover.
(8) Warmstart full validation 516: Validate entire cache during warmstart.
(9) Fence Device Adapter 518: Fence device adapter with error.
(10) Fence Host Adapter 520: Fence host adapter with error.
(11) Fence server 522: Fence server with error.
(12) Flush cache 524: Flush the cache of server with error.
(13) Shutdown 526: Shutdown storage controller.

Figure 6:
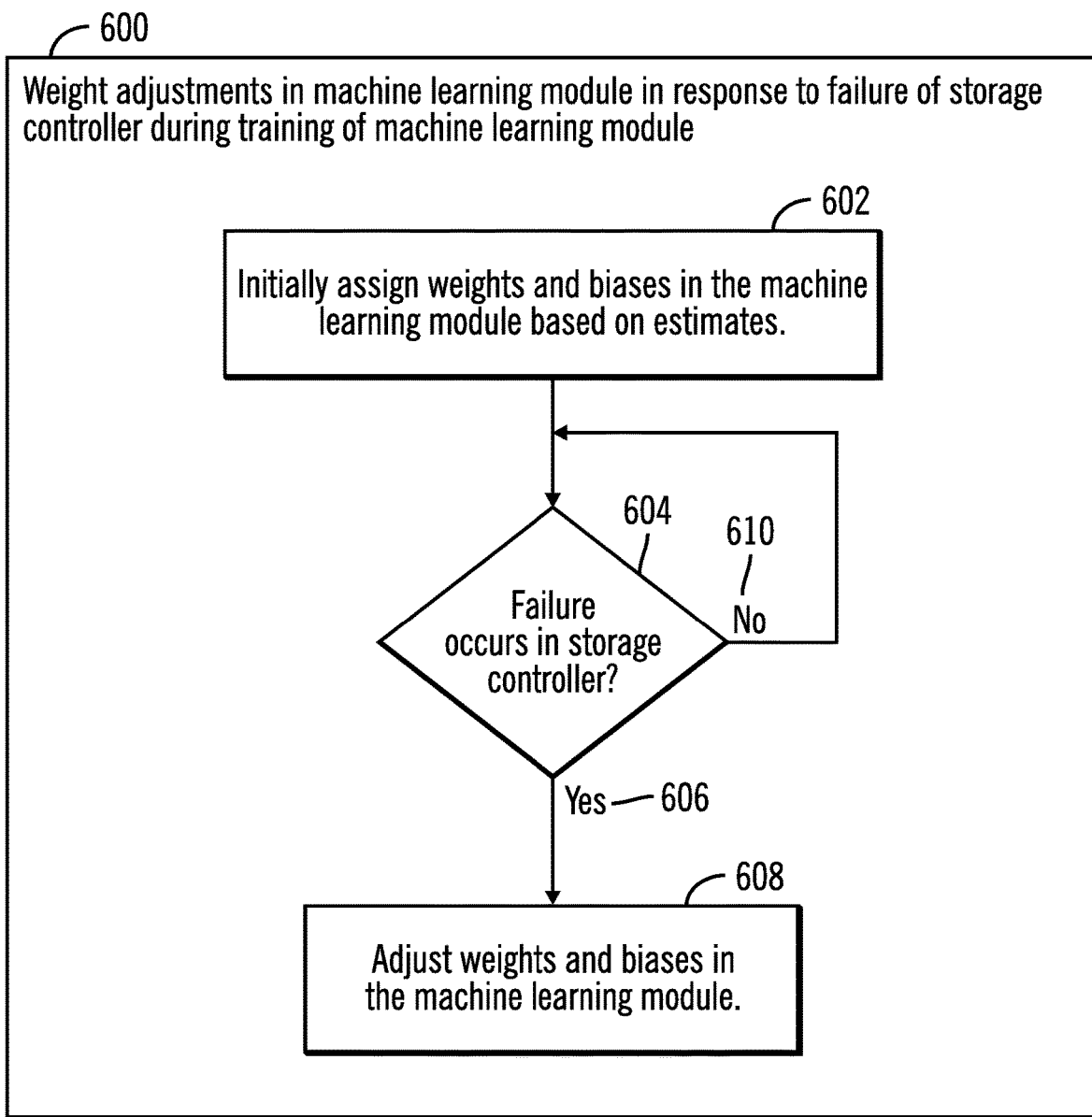
FIG. 6 illustrates a flowchart that shows how the weights and biases of the machine learning module are adjusted, in accordance with certain embodiments.

FIG. 6 illustrates a flowchart 600 that shows how the weights and biases of the machine learning module are adjusted, in accordance with certain embodiments.

Control starts at block 602 in which the recovery mechanism selection application 104 initially assigns weights and biases in the machine learning module 106 based on estimates. A determination is made at block 604 as to whether a failure has occurred in the storage controller 102. If so ("Yes" branch 606), control proceeds to block 608 in which weights and biases are adjusted in the machine learning module 106 based on a margin of error computed from the deviation of a generated output of the machine learning module 106 from an expected output of the machine learning module 106, where the expected output may be provided by a user or administrator. This is referred to as training the machine learning module 106 by adjustment of weights and biases so that learning occurs in the machine learning module 106 to provide improved outputs in the future.

In FIG. 6, if at block 604 a determination is made that a failure has not occurred in the storage controller 102 ("No" branch 610) then control is maintained at block 604.

Figure 7:
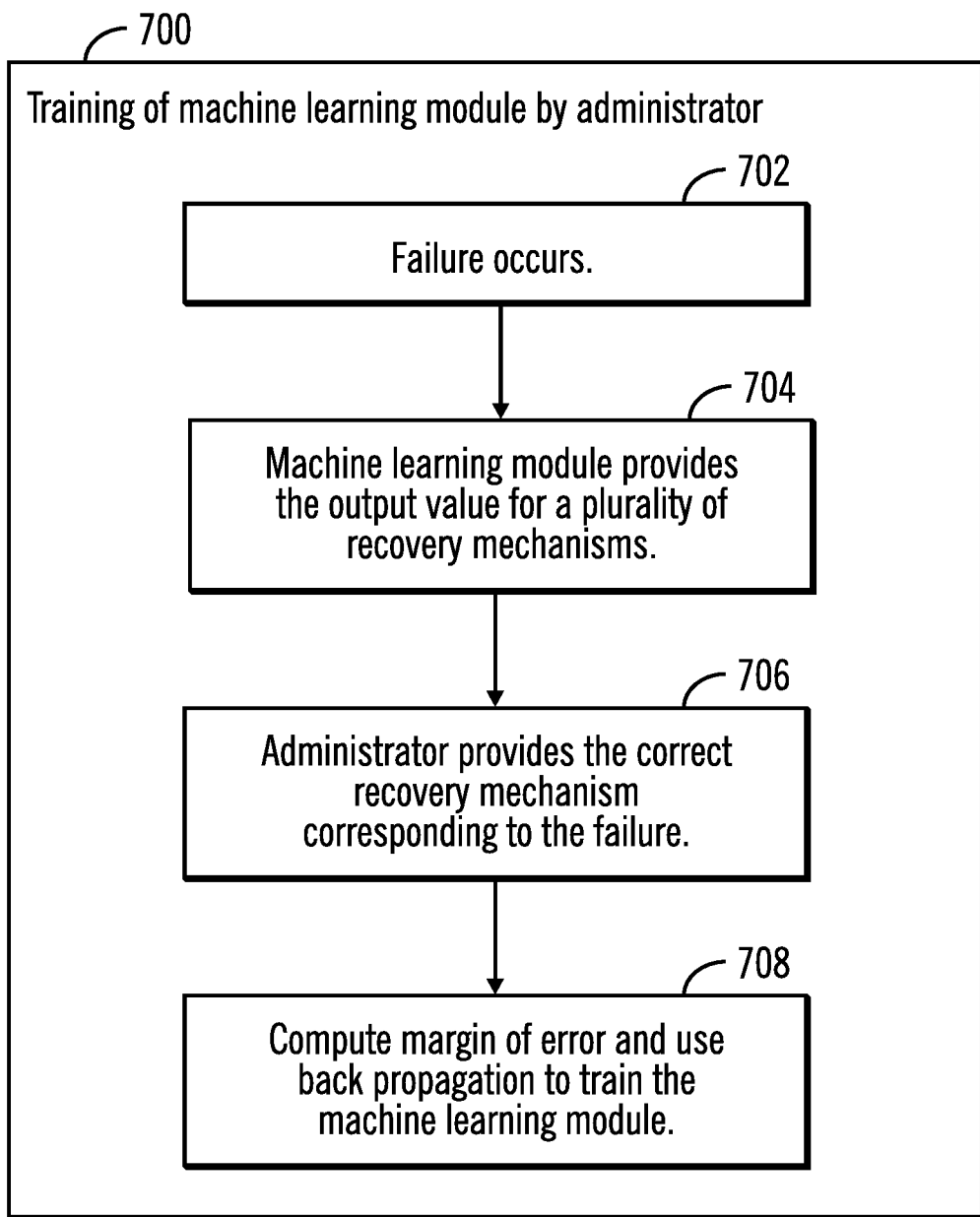
FIG. 7 illustrates a flowchart that shows a training of the machine learning module by an administrator, in accordance with certain embodiments.

FIG. 7 illustrates a flowchart 700 that shows a training of the machine learning module 106 by an administrator, in accordance with certain embodiments.

Control starts at block 702 in which a failure occurs. The machine learning module 106 provides (at block 704) via forward propagation, the output value for a plurality of recovery mechanisms. The administrator provides the correct recovery mechanism corresponding to the failure (at block 706). The margin of error is computed and back propagation is used (at block 708) to train the machine learning module 106.

Figure 8:
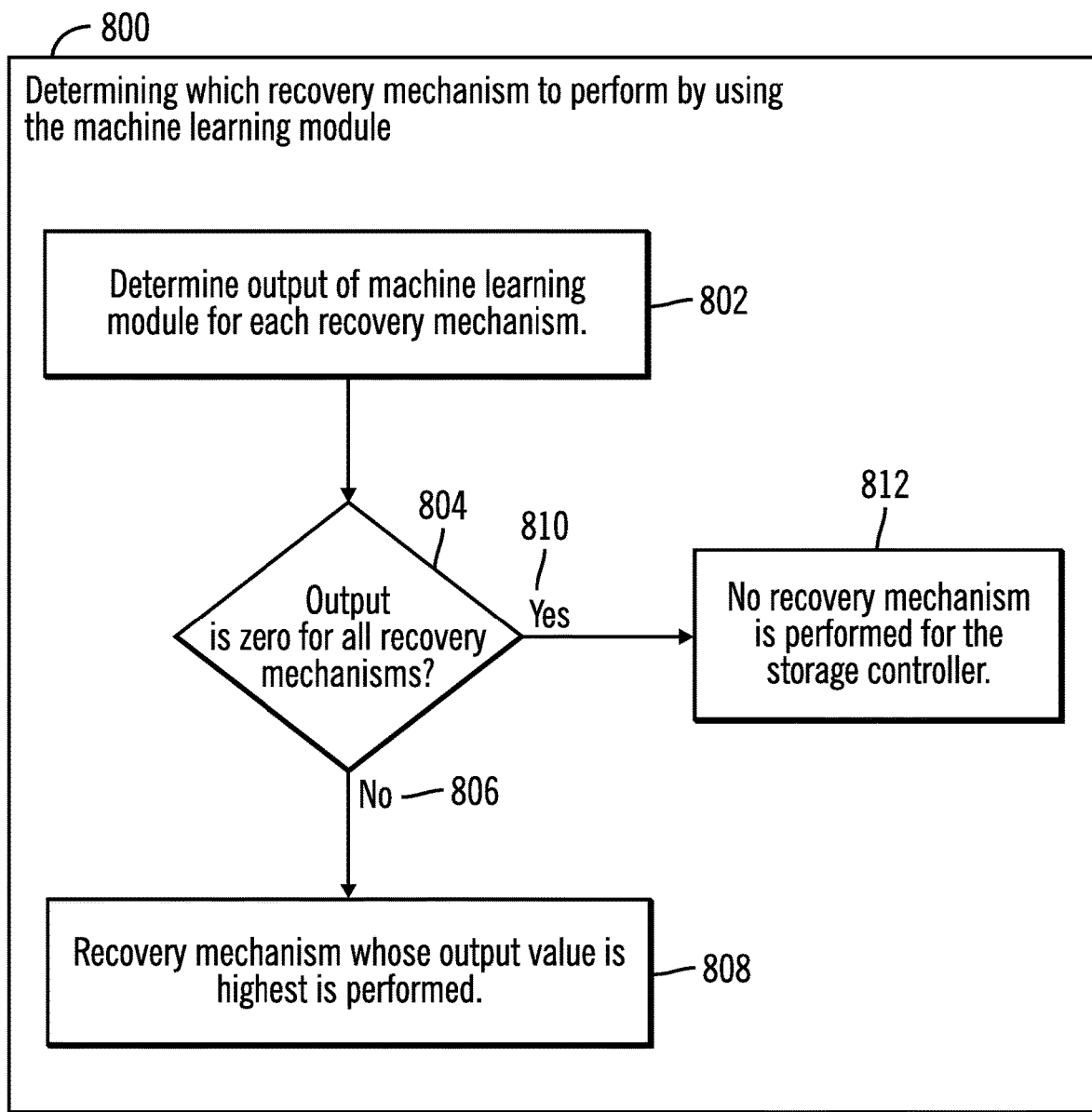
FIG. 8 illustrates a flowchart that shows a determination of a recovery mechanism to perform by using the machine learning module, in accordance with certain embodiments.

FIG. 8 illustrates a flowchart 800 that shows a determination of a recovery mechanism to perform by using the machine learning module 106, in accordance with certain embodiments.

Control starts at block 802 in which the output of the machine learning module 106 is determined for each recovery mechanism. Control proceeds to block 804 in which it is determined whether the output is zero for all recovery mechanisms. If not ("No" branch 806), then control proceeds to block 808 in which the recovery mechanism whose output has the highest value is performed.

If at block 804 it is determined that the output is zero for all recovery mechanisms ("Yes" branch 810) then control proceeds to block 812 in which no recovery mechanism is performed for the storage controller 102.

Figure 9:
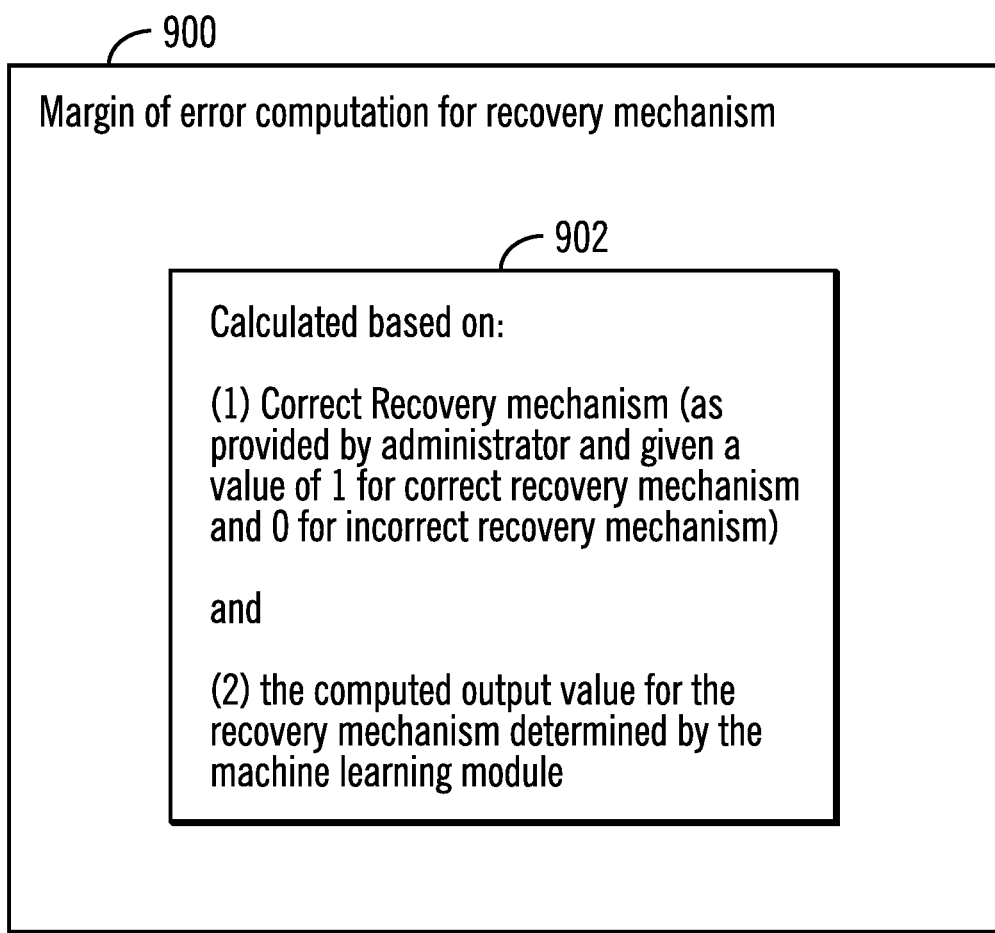
FIG. 9 illustrates a block diagram that shows how a margin of error of the machine learning module is calculated, in accordance with certain embodiments.

FIG. 9 illustrates a block diagram 900 that shows how a margin of error of the machine learning module 106 is calculated, in accordance with certain embodiments. In certain embodiments the margin of error is computed based on the correct recovery mechanism (as provided by an experienced administrator and given a value of 1 for the correct recovery mechanism, and 0 for an incorrect recovery mechanism) and the computed output value for the recovery mechanism determined by the machine learning module 106 (as shown via reference numeral 902).

FIG. 10 illustrates a block diagram 1000 that shows how adjustment of weights via back propagation is performed by computing a margin of error during a training of the machine learning module 106, in accordance with certain embodiments.

Reference numeral 1002 shows a table that indicates the output value for a recovery mechanism as computed by the machine learning module 106 for three different recovery mechanisms A, B, and C.

Reference numeral 1004 indicates that the administrator has indicated that the correct recovery mechanism should be recovery mechanism C.

Reference numeral 1006 indicates the computation of the margin of error of the output for each of the recovery mechanisms A, B, and C. Since the administrator has indicated that the correct recovery mechanism is C, the table entry 1008 is set to 1.0, whereas the table entries 1010 and 1012 are set to 0.0. The difference between the output value for recovery mechanism computed by the machine learning module 106 and the correct output value from the administrator provided information is the margin of error of the output for the recovery mechanism as shown via table entries 1014, 1016, and 1018, and these margin of errors are used to adjust weights and biases in the machine learning module 106 via back propagation (as shown via reference numeral 1020).

Figure 11:
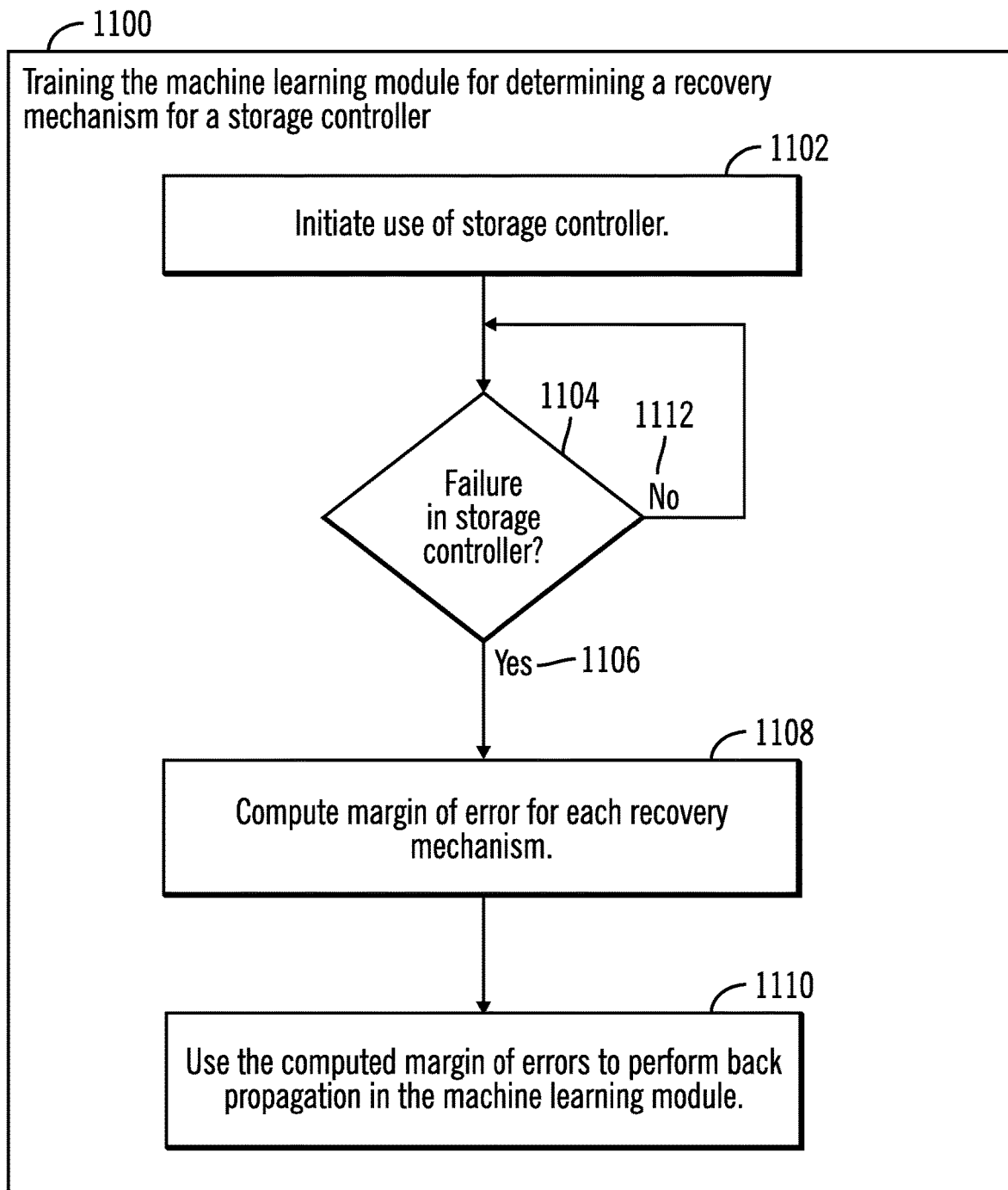
FIG. 11 illustrates a flowchart that shows the training of the machine learning module for generating a recovery mechanism for a storage controller, in accordance with certain embodiments.

FIG. 11 illustrates a flowchart 1100 that shows the training of the machine learning module 106 for generating a recovery mechanism for a storage controller 102, in accordance with certain embodiments.

Control starts at block 1102 in which the use of the storage controller 102 is initiated. The process determines whether a failure has occurred in the storage controller 102 (at block 1104). If a failure has occurred ("Yes" branch 1106) then control proceeds to block 1108 in which the process computes the margin of error for each recovery mechanism, and the computed margin of errors are used to perform (at block 1110) back propagation in the machine learning module 106.

If no failure has occurred in the storage controller 102 ("No" branch 1112), then after an interval of time a determination is made once again as to whether a failure has occurred in the storage controller 102.

Figure 12:
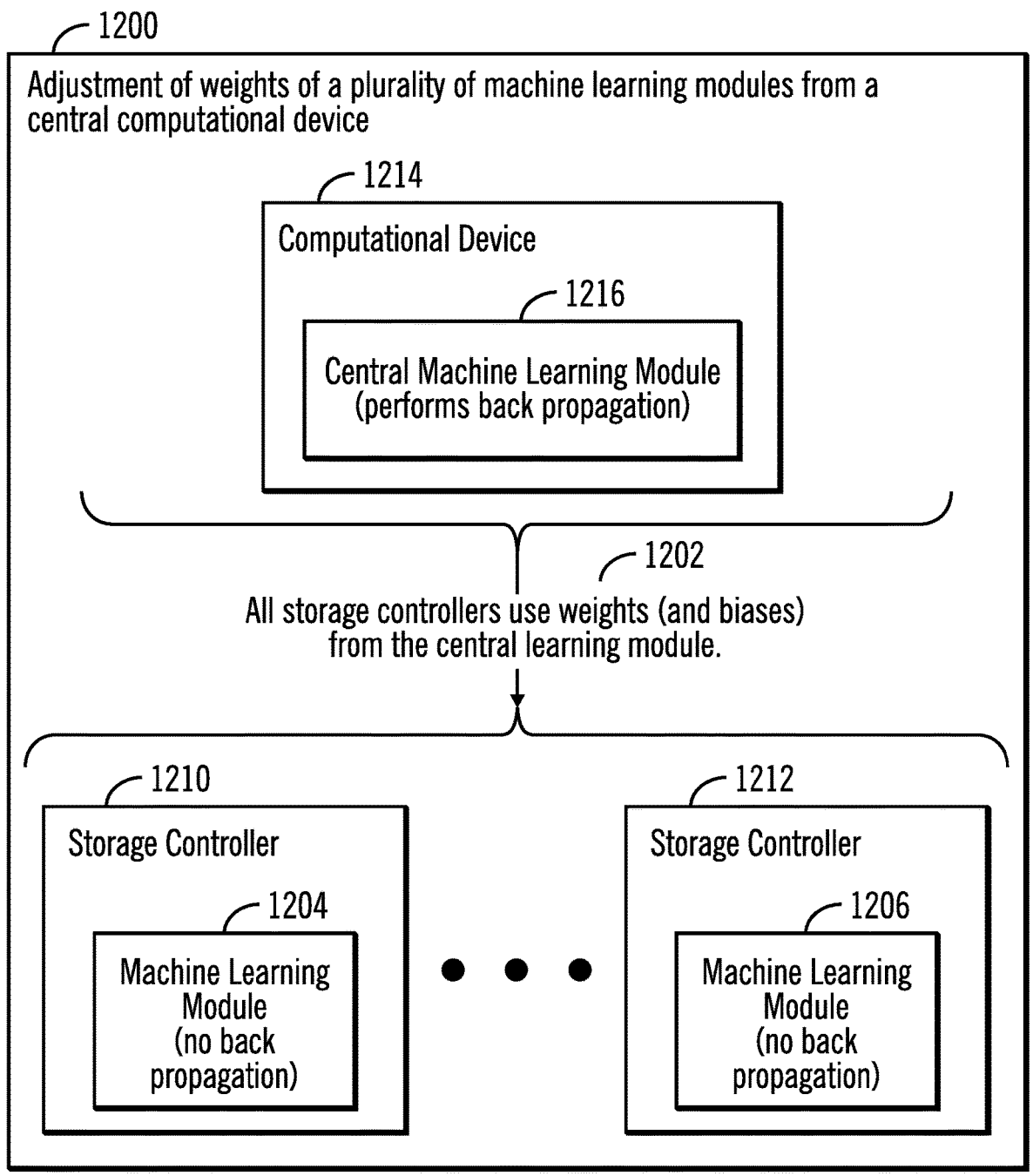
FIG. 12 illustrates a block diagram that shows the adjustment of weights of a plurality of machine learning modules from a central computational device, in accordance with certain embodiments.

FIG. 12 illustrates a block diagram 1200 that shows the adjustment of weights of a plurality of machine learning modules 1204, 1206 of a plurality of storage controller 1210, 1212 from a central computational device 1214, in accordance with certain embodiments (as shown via reference numeral 1202). In certain embodiments, only the central machine learning module 1216 that executes in the central computational device 1214 performs back propagation and then shares the weight and bias changes with the local machine learning modules 1204, 1206 of the storage controllers 1210, 1212.

Figure 13:
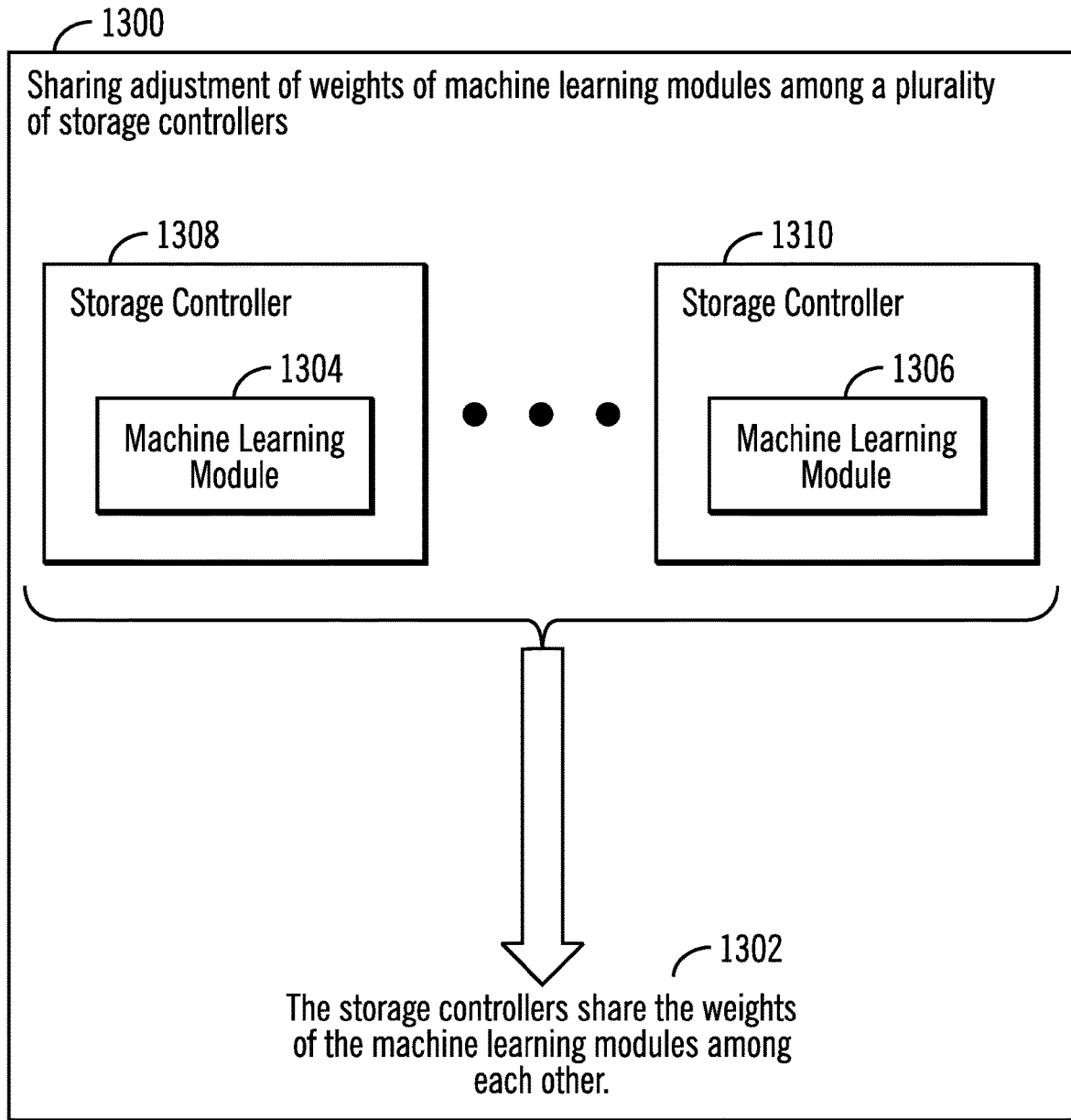
FIG. 13 illustrates a block diagram that shows the sharing of the adjustment of weights of machine learning modules among a plurality of storage controllers, in accordance with certain embodiments.

FIG. 13 illustrates a block diagram 1300 that shows the sharing (reference numeral 1302) of the adjustment of weights and biases of machine learning modules 1304, 1306 among a plurality of storage controllers 1308, 1310, in accordance with certain embodiments. This is a form of peer to peer sharing of weights and biases among a plurality of storage controllers to collectively improve the training of a plurality of machine learning modules. In case the storage controllers 1308, 1310 are similar then such mechanisms may accelerate the process of training the machine learning modules 1304, 1306.

Figure 14:
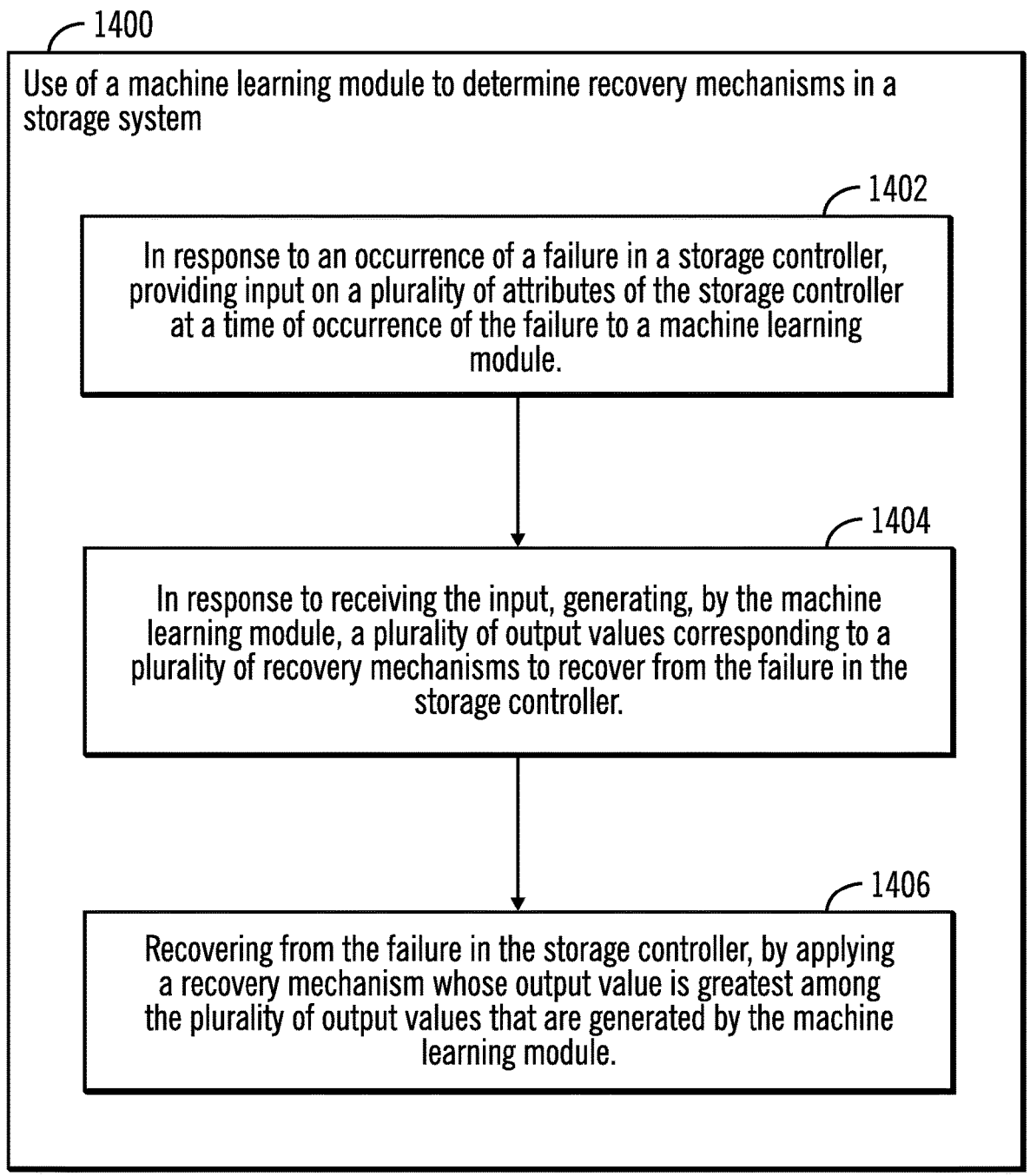
FIG. 14 illustrates a flowchart that shows the use of a machine learning module to determine recovery mechanisms in a storage system, in accordance with certain embodiments.

FIG. 14 illustrates a flowchart 1400 that shows the use of a machine learning module 106 to determine recovery mechanisms in a storage system, such as the storage controller 102, in accordance with certain embodiments.

Control starts at block 1402 in which in response to an occurrence of a failure in a storage controller 102, an input on a plurality of attributes of the storage controller 102 at a time of occurrence of the failure is provided to a machine learning module 106. In response to receiving the input, the machine learning module 106 generates (at block 1404) a plurality of output values corresponding to a plurality of recovery mechanisms to recover from the failure in the storage controller 102. A recovery is made from the failure in the storage controller 102, by applying (at block 1406) a recovery mechanism whose output value is greatest among the plurality of output values that are generated by the machine learning module.

Therefore, FIG. 14 shows how the machine learning module 106 is used to determine how to recover from a failure by determining the output value of the machine learning module 106.

Figure 15:
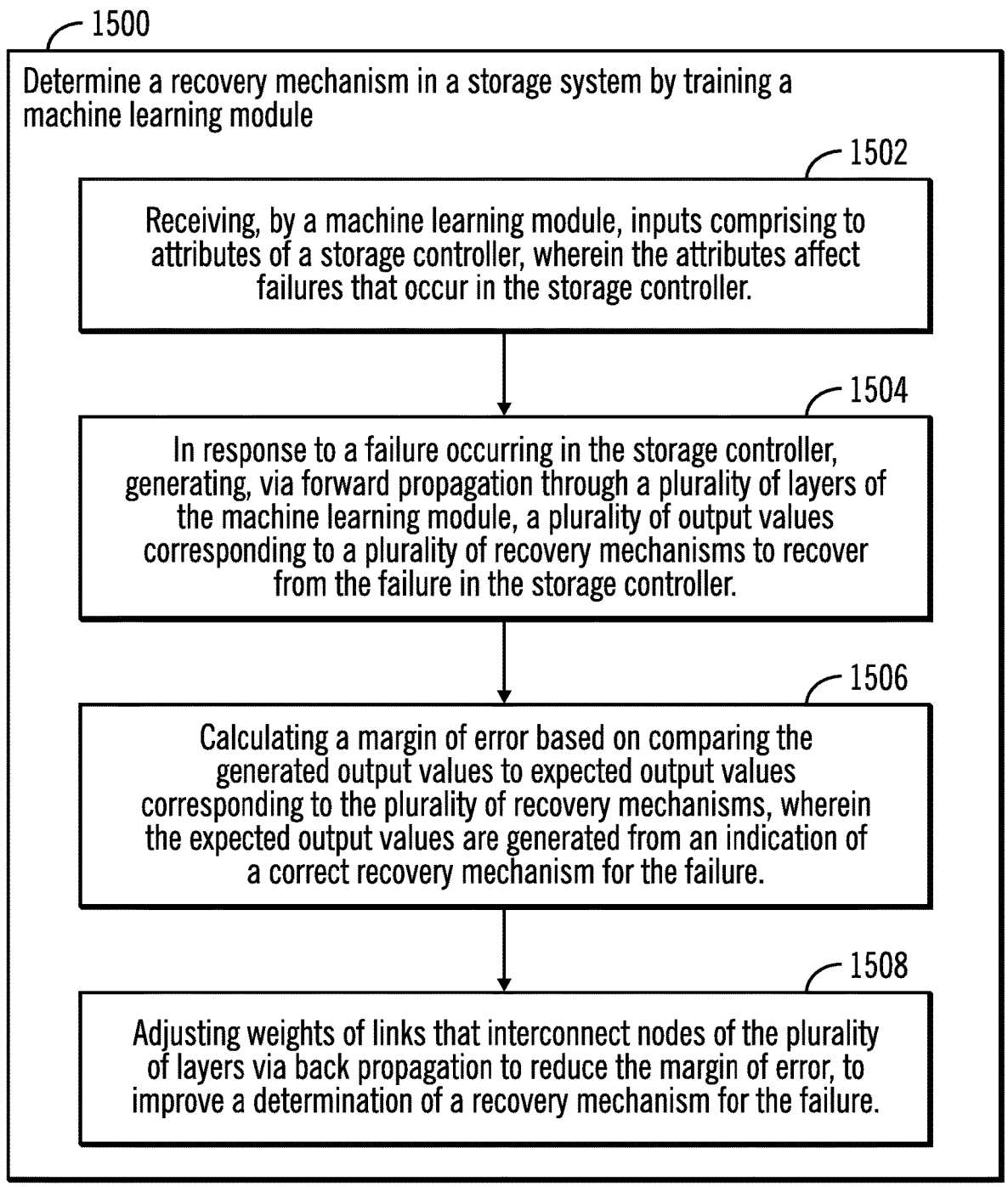
FIG. 15 illustrates a flowchart that shows a determination of a recovery mechanism in a storage system by training a machine learning module, in accordance with certain embodiments.

FIG. 15 illustrates a flowchart 1500 that shows a determination of a recovery mechanism in a storage system (e.g., a storage controller 102) by training a machine learning module 106, in accordance with certain embodiments.

Control starts at block 1502 in which a machine learning module 106 receives inputs comprising to attributes of a storage controller 102, wherein the attributes affect failures that occur in the storage controller 102. In response to a failure occurring in the storage controller 102, the process generates (at block 1504), via forward propagation through a plurality of layers of the machine learning module 106, a plurality of output values corresponding to a plurality of recovery mechanisms to recover from the failure in the storage controller 102.

From block 1504 control proceeds to block 1506 in which the process calculates a margin of error based on comparing the generated output values to expected output values corresponding to the plurality of recovery mechanisms, wherein the expected output values are generated from an indication of a correct recovery mechanism for the failure. The process adjusts (at block 1508) weights of links that interconnect nodes of the plurality of layers via back propagation to reduce the margin of error, to improve a determination of a recovery mechanism for the failure.

It should be noted that the margin of error for the machine learning module may be computed differently in different embodiments. In certain embodiments, the margin of error for training the machine learning module may be based on comparing the generated output value of the machine learning to an expected output value. Other embodiments may calculate the margin of error via different mechanisms. A plurality of margin of errors may be aggregated into a single margin of error and the single margin of error may be used to adjust weights and biases, or the machine learning module may adjust weights and biases based on a plurality of margin of errors.

Therefore, FIGS. 1-15 illustrate certain embodiments, in which a machine learning module 106 is used to determine the recovery mechanism to use in a storage controller 102.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 16:
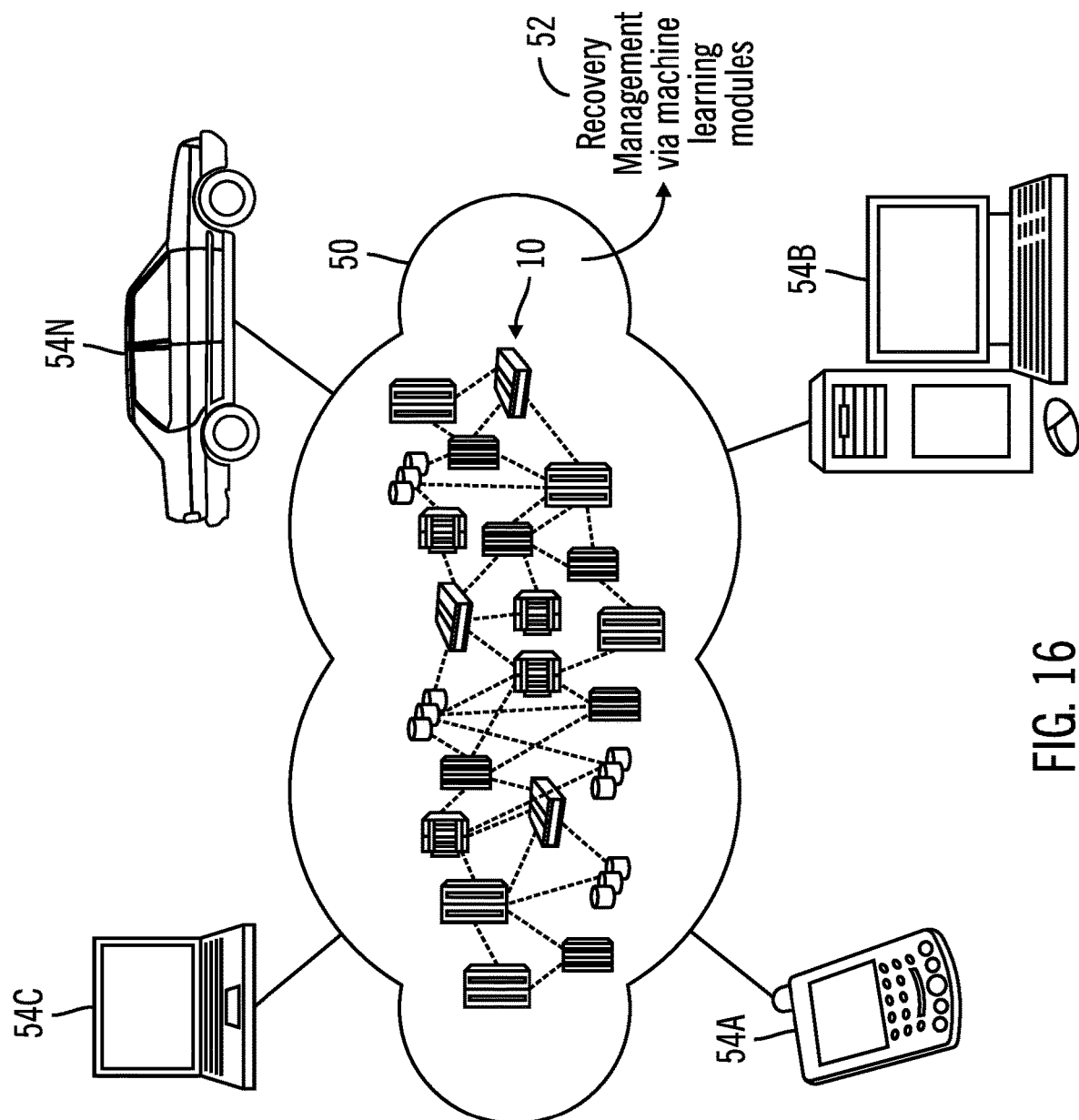
FIG. 16 illustrates a block diagram of a cloud computing environment for implementing the operations described in FIGS. 1-15, in accordance with certain embodiments.

Referring now to FIG. 16 an illustrative cloud computing environment 50 is depicted. Recovery management via machine learning modules (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
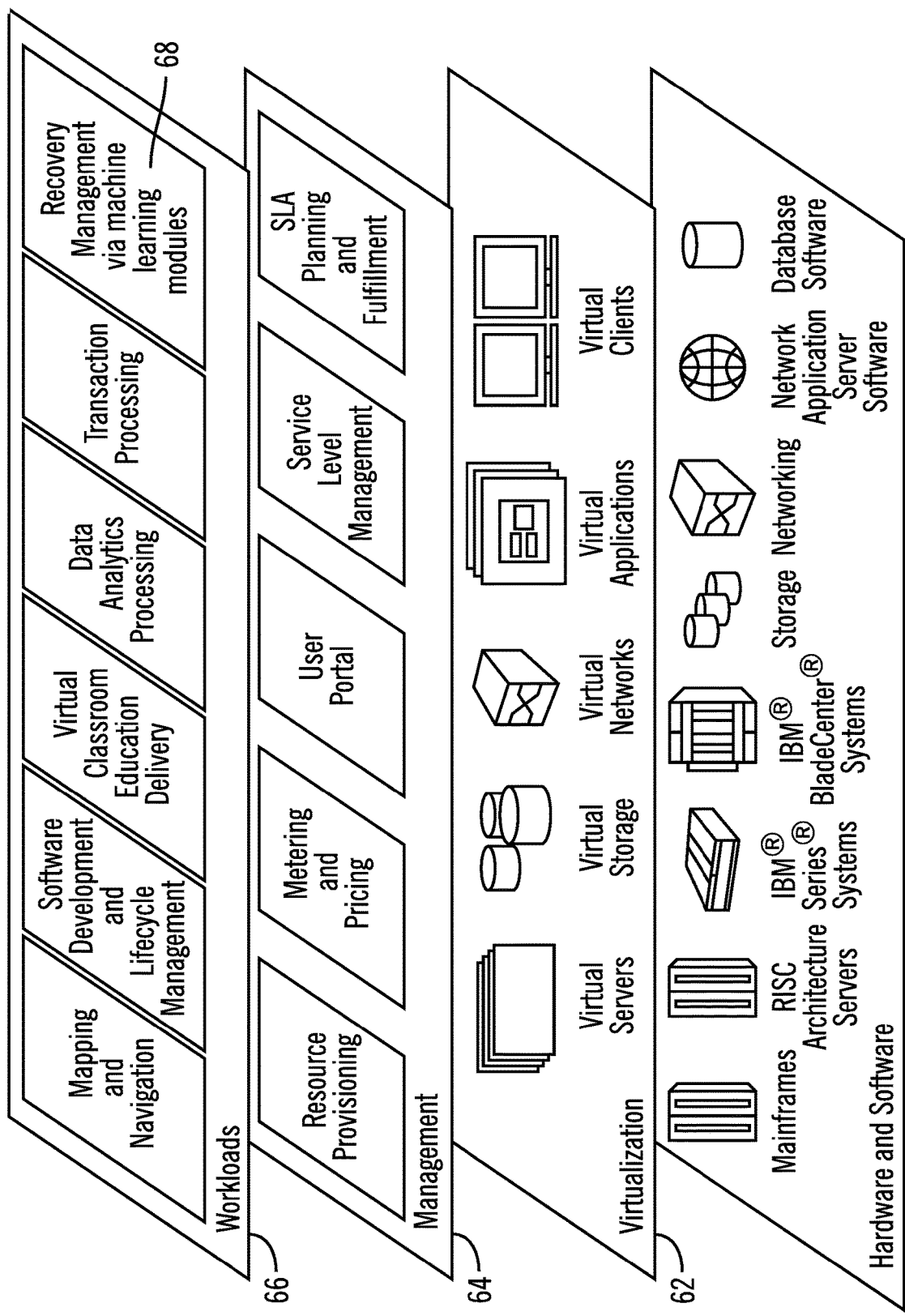
FIG. 17 illustrates a block diagram that shows further details of the cloud computing environment of FIG. 16 in accordance with certain embodiments.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

* IBM, ZSERIES, PSERIES, XSERIES, BLADECENTER, WEBSPHERE, AND DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and recovery management via machine learning modules 68 as shown in FIGS. 1-16.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 18:
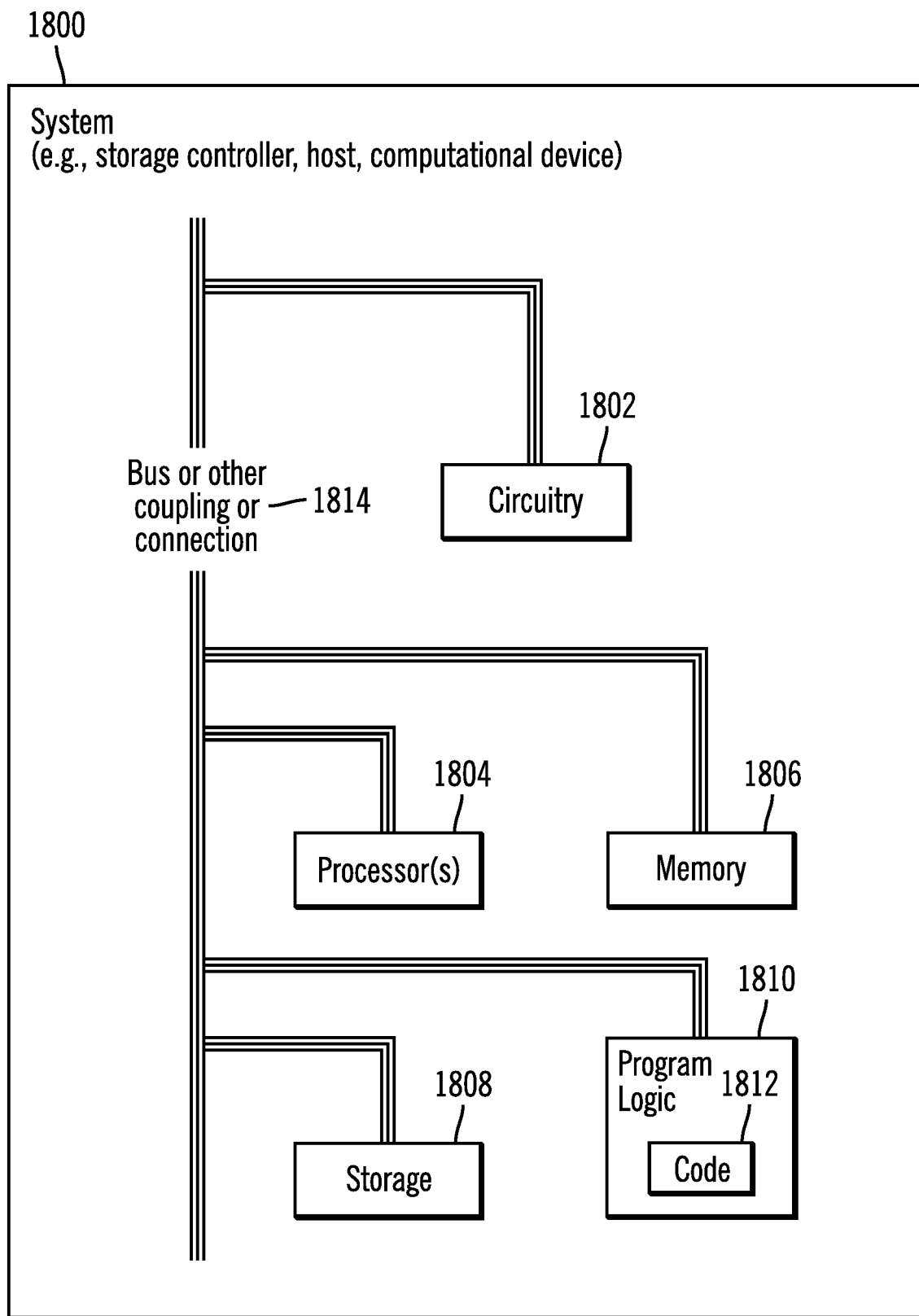
FIG. 18 illustrates a block diagram of a computational system, in accordance with certain embodiments.

FIG. 18 illustrates a block diagram that shows certain elements that may be included in the storage controller 102, or other computational devices 108 in accordance with certain embodiments. The system 1800 may include a circuitry 1802 that may in certain embodiments include at least a processor 1804. The system 1800 may also include a memory 1806 (e.g., a volatile memory device), and storage 1808. The storage 1808 may include a non-volatile memory device (e.g., EEPROM, ROM, PROM, flash, firmware, programmable logic, etc.), magnetic disk drive, optical disk drive, tape drive, etc. The storage 1808 may comprise an internal storage device, an attached storage device and/or a network accessible storage device. The system 1800 may include a program logic 1810 including code 1812 that may be loaded into the memory 1806 and executed by the processor 1804 or circuitry 1802. In certain embodiments, the program logic 1810 including code 1812 may be stored in the storage 1808. In certain other embodiments, the program logic 1810 may be implemented in the circuitry 1802. One or more of the components in the system 1800 may communicate via a bus or via other coupling or connection 1814. While FIG. 18 shows the program logic 1810 separately from the other elements, the program logic 1810 may be implemented in the memory 1806 and/or the circuitry 1802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments.

Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   in response to an occurrence of a failure in a storage controller, providing input on a plurality of attributes of the storage controller at a time of occurrence of the failure to a machine learning module;
   in response to receiving the input, generating, by the machine learning module, a plurality of output values corresponding to a plurality of recovery mechanisms to recover from the failure in the storage controller; and
   recovering from the failure in the storage controller, by applying a recovery mechanism whose output value is greatest among the plurality of output values that are generated by the machine learning module.

2. The method of claim 1, wherein the storage controller controls access to a plurality of storage devices for a plurality of hosts, and wherein the storage controller is comprised of:
   a host adapter that is an interface between the storage controller and a host computational device;
   a device adapter that is an interface between the storage controller and a storage device that is in a Redundant Array of Independent Disks (RAID) configuration;
   a cache; and
   a non-volatile storage (NVS).

3. The method of claim 2, wherein the plurality of attributes includes:
   measures corresponding to indications and characteristics of errors and panics that have been generated in the storage controller; and
   a measure of a hardware part associated with the failure.

4. The method of claim 2, wherein the plurality of attributes includes:
   a measure of whether the cache is queued for segments;
   a measure of whether the NVS is queued for segments;
   a measure of whether the device adapter is queued for resources; and
   a measure of whether a RAID rebuild is in progress.

5. The method of claim 2, wherein the plurality of attributes includes:
   a measure of whether the storage controller is executing a mainline code or an error recovery code at a time of the failure;
   a measure of whether the device adapter is fenced; and
   a measure of whether the host adapter is fenced.

6. The method of claim 2, wherein the plurality of attributes includes:

a measure of whether the storage controller is in a single server configuration or is in a dual server configuration; and a measure of previously known recovery mechanisms for errors corresponding to the failure.

7. The method of claim 1, the method further comprising:

transmitting, by the storage controller, the plurality of output values to a central computing device that generates weights and biases to be applied to machine learning modules of a plurality of storage controllers.

8. A system, comprising:

a memory; and a processor coupled to the memory, wherein the processor performs operations, the operations comprising:

in response to an occurrence of a failure in a storage controller, providing input on a plurality of attributes of the storage controller at a time of occurrence of the failure to a machine learning module;

in response to receiving the input, generating, by the machine learning module, a plurality of output values corresponding to a plurality of recovery mechanisms to recover from the failure in the storage controller; and recovering from the failure in the storage controller, by applying a recovery mechanism whose output value is greatest among the plurality of output values that are generated by the machine learning module.

9. The system of claim 8, wherein the storage controller controls access to a plurality of storage devices for a plurality of hosts, and wherein the storage controller is comprised of:

a host adapter that is an interface between the storage controller and a host computational device;

a device adapter that is an interface between the storage controller and a storage device that is in a Redundant Array of Independent Disks (RAID) configuration;

a cache; and a non-volatile storage (NVS).

10. The system of claim 9, wherein the plurality of attributes includes:

measures corresponding to indications and characteristics of errors and panics that have been generated in the storage controller; and a measure of a hardware part associated with the failure.

11. The system of claim 9, wherein the plurality of attributes includes:

a measure of whether the cache is queued for segments;

a measure of whether the NVS is queued for segments;

a measure of whether the device adapter is queued for resources; and a measure of whether a RAID rebuild is in progress.

12. The system of claim 9, wherein the plurality of attributes includes:

a measure of whether the storage controller is executing a mainline code or an error recovery code at a time of the failure;

a measure of whether the device adapter is fenced; and a measure of whether the host adapter is fenced.

13. The system of claim 9, wherein the plurality of attributes includes:

a measure of whether the storage controller is in a single server configuration or is in a dual server configuration; and a measure of previously known recovery mechanisms for errors corresponding to the failure.

14. The system of claim 8, the operations further comprising:

transmitting, by the storage controller, the plurality of output values to a central computing device that generates weights and biases to be applied to machine learning modules of a plurality of storage controllers.

15. A computer program product, the computer program product comprising a computer readable storage medium having computer readable program code embodied therewith, the computer readable program code configured to perform operations in a storage controller or a computational device, the operations comprising:

in response to an occurrence of a failure in the storage controller, providing input on a plurality of attributes of the storage controller at a time of occurrence of the failure to a machine learning module;

in response to receiving the input, generating, by the machine learning module, a plurality of output values corresponding to a plurality of recovery mechanisms to recover from the failure in the storage controller; and recovering from the failure in the storage controller, by applying a recovery mechanism whose output value is greatest among the plurality of output values that are generated by the machine learning module.

16. The computer program product of claim 15, wherein the storage controller controls access to a plurality of storage devices for a plurality of hosts, and wherein the storage controller is comprised of:

a host adapter that is an interface between the storage controller and a host computational device;

a device adapter that is an interface between the storage controller and a storage device that is in a Redundant Array of Independent Disks (RAID) configuration;

a cache; and a non-volatile storage (NVS).

17. The computer program product of claim 16, wherein the plurality of attributes includes:

measures corresponding to indications and characteristics of errors and panics that have been generated in the storage controller; and a measure of a hardware part associated with the failure.

18. The computer program product of claim 16, wherein the plurality of attributes includes:

a measure of whether the cache is queued for segments;

a measure of whether the NVS is queued for segments;

a measure of whether the device adapter is queued for resources; and a measure of whether a RAID rebuild is in progress.

19. The computer program product of claim 16, wherein the plurality of attributes includes:

a measure of whether the storage controller is executing a mainline code or an error recovery code at a time of the failure;

a measure of whether the device adapter is fenced;

a measure of whether the host adapter is fenced;

a measure of whether the storage controller is in a single server configuration or is in a dual server configuration; and a measure of previously known recovery mechanisms for errors corresponding to the failure.

20. The computer program product of claim 15, the operations further comprising:

transmitting, by the storage controller, the plurality of output values to a central computing device that generates weights and biases to be applied to machine learning modules of a plurality of storage controllers.

* * * * *